(12) United States Patent
Hiraguchi et al.

(10) Patent No.: US 7,475,839 B2
(45) Date of Patent: Jan. 13, 2009

(54) RECORDING TAPE CARTRIDGE

(75) Inventors: Kazuo Hiraguchi, Kanagawa (JP); Kiyoo Morita, Kanagawa (JP); Kenji Takenoshita, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 12/014,966

(22) Filed: Jan. 16, 2008

(65) Prior Publication Data
US 2008/0179440 A1 Jul. 31, 2008

(30) Foreign Application Priority Data
Jan. 26, 2007 (JP) ............... 2007-016991
Sep. 21, 2007 (JP) ............... 2007-245134

(51) Int. Cl.
*G11B 23/107* (2006.01)
(52) U.S. Cl. .................................. 242/348.2
(58) Field of Classification Search ................. 242/348, 242/348.2, 332.4, 532.1; 360/132
See application file for complete search history.

(56) References Cited
U.S. PATENT DOCUMENTS
6,499,684 B2 * 12/2002 Eaton et al. .............. 242/332.4
6,659,380 B2 * 12/2003 Shiga et al. ............... 242/348.2
7,243,871 B2 * 7/2007 Moses et al. .............. 242/348.2
2002/0109027 A1 * 8/2002 Ishihara et al. ............. 242/348
2004/0031871 A1 * 2/2004 Satoh et al. ............... 242/348.2
2004/0041051 A1 * 3/2004 Ishihara .................... 242/348.2
2006/0071109 A1 * 4/2006 Moses et al. .............. 242/348.2

FOREIGN PATENT DOCUMENTS
JP 2001-148179 A 5/2001

* cited by examiner

*Primary Examiner*—William A Rivera
(74) *Attorney, Agent, or Firm*—Sughrue Mion, PLLC

(57) ABSTRACT

A recording tape cartridge, comprising: a leader pin at which flange portions are formed at both ends, holding portions formed at a case and holding the flange portions of the leader pin in a vicinity of an opening, overhanging portions formed at the holding portions and overlapping the flange portions at inner surface sides thereof, and wall surfaces which are formed at the holding portions and which peripheral surfaces of the flange portions oppose, wherein a clearance between the inner surface of the flange portion and the overhanging portion, and a clearance between the peripheral surface of the flange portion and the wall surface, are defined such that, when the leader pin tilts, the peripheral surface of the flange portion contacts the wall surface before the inner surface of the flange portion contacts the overhanging portion, is provided.

14 Claims, 12 Drawing Sheets

RECORDING TAPE CARTRIDGE

CROSS-REFERENCE TO RELATED APPLICATION

This application claims priority under 35 USC 119 from Japanese Patent Application Nos. 2007-016991 and 2007-245134, the disclosures of which are incorporated by reference herein.

BACKGROUND

1. Technical Field

The present invention relates to a recording tape cartridge which accommodates, within a case, a single reel on which is wound a recording tape such as a magnetic tape or the like which is used as a recording/playback medium mainly of computers and the like.

2. Related Art

There are conventionally known recording tape cartridges in which a recording tape, such as a magnetic tape or the like which is used as a data recording/playback medium of computers or the like, is .wound on a reel, and the single reel is accommodated within a case which is structured by an upper case and a lower case. A leader member, which is pulled-out by a pull-out member of a drive device, is fixed to the distal end of the recording tape. An example of the leader member is a substantially dumbbell-shaped leader pin having flange portions at both ends of a main body portion to which the recording tape is fixed either directly or via a leader tape.

The flange portions of the leader pin are accommodated in concave holding portions which are formed at the upper case and the lower case in the vicinity of an opening. The leader pin is held, with the heightwise direction of the case being its axial direction, due to the flange portions being restrained by springs or the like. Accordingly, there is the concern that, when a shock is applied to the vicinity of the opening due to the recording tape cartridge being dropped or the like, and the upper case and the lower case flexurally deform so as to separate from one another (so-called opening), the flange portions will come out from the holding portions and the leader pin will tilt or separate from the holding portions.

If such a phenomenon occurs, poor chucking of the leader pin by the pull-out member of the drive device occurs, and the problem of a system error arises. Therefore, there has conventionally been proposed a recording tape cartridge in which undercut portions on which the flange portions of the leader pin are anchored, i.e., overhanging portions which overlap the flange portions, are formed at the holding portions and prevent the flange portions of the leader pin from coming out from the holding portions (see, for example, Japanese Patent Application Laid-Open (JP-A) No. 2001-148179).

However, because the overhanging portions are in a positional relationship of being adjacent to hooks or the like of the pull-out member of the drive device, the plate thickness of the overhanging portions cannot be formed to be thick. Namely, if the plate thickness of the overhanging portions is made to be thick, the problem that the hooks or the like will interfere therewith arises. Accordingly, if a shock is applied to the case due to the recording tape cartridge being dropped or the like and the leader pin tilts or moves in a direction other than the pull-out direction thereof, for example, in a direction substantially orthogonal to the pull-out direction (e.g., the heightwise direction or a direction orthogonal to the heightwise direction), there is the concern that the overhanging portions will break due to the pushing force applied from the leader pin.

SUMMARY

In view of the aforementioned, an object of the present invention is to provide a recording tape cartridge in which, even if a shock such as being dropped or the like is applied to a case, there is no fear that overhanging portions which overlap flange portions of a leader pin will break.

In order to achieve the above-described object, a recording tape cartridge of a first aspect of the present invention has: a case having an upper case and a lower case, and accommodating a single reel on which a recording tape is wound; a leader pin attached directly or via a leader tape to an end portion of the recording tape, flange portions being formed at both ends of the leader pin; an opening formed in the case for pulling-out of the leader pin; holding portions formed at the upper case and the lower case, and holding the flange portions of the leader pin in a vicinity of the opening; an overhanging portion formed at least one of the holding portions, and overlapping the flange portion in a non-contact state at an inner surface side in the tape width direction of the flange portion when the leader pin is held by the holding portions; and wall surfaces formed at the holding portions, peripheral surfaces of the flange portions opposing the wall surfaces when the leader pin is held by the holding portions, wherein a clearance between the inner surface of the flange portion and the overhanging portion and a clearance between the peripheral surface of the flange portion and the wall surface are defined such that, when the leader pin tilts, the peripheral surface of the flange portion contacts the wall surface before the inner surface of the flange portion contacts the overhanging portion.

Further, a recording tape cartridge of a fourth aspect of the present invention has: a case having an upper case and a lower case, and accommodating a single reel on which a recording tape is wound; a leader pin attached directly or via a leader tape to an end portion of the recording tape, flange portions being formed at both ends of the leader pin; an opening formed in the case for pulling-out of the leader pin; holding portions formed at the upper case and the lower case, and holding the flange portions of the leader pin in a vicinity of the opening; an overhanging portion mounted to at least one of the holding portions, and overlapping the flange portion in a non-contact state at an inner surface side of the flange portion when the leader pin is held by the holding portions; and wall surfaces formed at the holding portions, peripheral surfaces of the flange portions opposing the wall surfaces when the leader pin is held by the holding portions, wherein a clearance between the inner surface of the flange portion and the overhanging portion and a clearance between the peripheral surface of the flange portion and the wall surface are defined such that, when the leader pin tilts, the peripheral surface of the flange portion contacts the wall surface before the inner surface of the flange portion contacts the overhanging portion.

In accordance with the first aspect and the fourth aspect, when a shock is applied to the case due to dropping or the like and the leader pin starts to tilt in a direction other than the pull-out direction thereof, first, the peripheral surface of the flange portion of the leader pin collides with (presses against) the wall surface formed at the holding portion. Therefore, the inner surface of the flange portion does not contact (press against) the overhanging portion. Accordingly, there is no fear that the overhanging portion will break. Note that, because the wall surface which is formed at the holding portion has relatively high rigidity, it can sufficiently withstand even the peripheral surface of the flange portion colliding against (pressing against) the wall surface.

Further, a recording tape cartridge of a seventh aspect of the present invention has: a case having an upper case and a lower case, and accommodating a single reel on which a recording tape is wound; a leader pin attached directly or via a leader tape to an end portion of the recording tape, flange portions being formed at both ends of the leader pin; an opening formed in the case for pulling-out of the leader pin; holding portions formed at the upper case and the lower case, and holding the flange portions of the leader pin in a vicinity of the opening; and an overhanging portion provided at least one of the holding portions, and overlapping the flange portion in a non-contact state at an inner surface side of the flange portion when the leader pin is held by the holding portions, wherein a difference between an interval, which is between the holding portion formed at the upper case and the holding portion formed at the lower case, and a height of the leader pin including the flange portions is less than a difference between an interval, which is between an outer surface of the overhanging portion and the holding portion, and a thickness of the flange portion.

In accordance with the seventh aspect, the difference between the interval, which is between the holding portion formed at the upper case and the holding portion formed at the lower case, and the height of the leader pin including the flange portions is less than the difference between the interval, which is between the outer surface of the overhanging portion and the holding portion, and the thickness of the flange portion. Therefore, even if a shock is applied to the case due to dropping or the like and the leader pin moves in the heightwise direction thereof, the inner surface of the flange portion of the leader pin does not contact (press against) the overhanging portion. Accordingly, there is no fear that the overhanging portion will break. Note that the overhanging portion may be structured so as to be formed integrally with the holding portion, or may be structured so as to be mounted to the holding portion as a separate body.

A recording tape cartridge of a second aspect of the present invention has: a case having an upper case and a lower case, and accommodating a single reel on which a recording tape is wound; a leader pin attached directly or via a leader tape to an end portion of the recording tape, flange portions being formed at both ends of a main body portion of the leader pin; an opening formed in the case for pulling-out of the leader pin; holding portions formed at the upper case and the lower case, and holding the flange portions of the leader pin in a vicinity of the opening; an overhanging portion formed at least one of the holding portions, and overlapping the flange portion at an inner surface side in the tape width direction of the flange portion when the leader pin is held by the holding portions; and wall surfaces formed at the holding portions, peripheral surfaces of the flange portions opposing the wall surfaces when the leader pin is held by the holding portions, wherein a clearance between the main body portion and the overhanging portion and a clearance between the peripheral surface of the flange portion and the wall surface are defined such that, when the leader pin tilts, the peripheral surface of the flange portion contacts the wall surface before the main body portion contacts the overhanging portion.

Further, a recording tape cartridge of a fifth aspect of the present invention has: a case having an upper case and a lower case, and accommodating a single reel on which a recording tape is wound; a leader pin attached directly or via a leader tape to an end portion of the recording tape, flange portions being formed at both ends of a main body portion of the leader pin; an opening formed in the case for pulling-out of the leader pin; holding portions formed at the upper case and the lower case, and holding the flange portions of the leader pin in a vicinity of the opening; an overhanging portion mounted to at least one of the holding portions, and overlapping the flange portion at an inner surface side of the flange portion when the leader pin is held by the holding portions; and wall surfaces formed at the holding portions, peripheral surfaces of the flange portions opposing the wall surfaces when the leader pin is held by the holding portions, wherein a clearance between the main body portion and the overhanging portion and a clearance between the peripheral surface of the flange portion and the wall surface are defined such that, when the leader pin tilts, the peripheral surface of the flange portion contacts the wall surface before the main body portion contacts the overhanging portion.

In accordance with the second aspect and the fifth aspect, when a shock is applied to the case due to dropping or the like and the leader pin starts to tilt in a direction other than the pull-out direction thereof, first, the peripheral surface of the flange portion of the leader pin collides with (presses against) the wall surface formed at the holding portion. Therefore, the main body portion of the leader pin does not contact (press against) the overhanging portion. Accordingly, there is no fear that the overhanging portion will break. Note that, because the wall surface which is formed at the holding portion has relatively high rigidity, it can sufficiently withstand even the peripheral surface of the flange portion colliding against (pressing against) the wall surface.

Further, a recording tape cartridge of an eighth aspect of the present invention has: a case having an upper case and a lower case, and accommodating a single reel on which a recording tape is wound; a leader pin attached directly or via a leader tape to an end portion of the recording tape, flange portions being formed at both ends of a main body portion of the leader pin; an opening formed in the case for pulling-out of the leader pin; an opening formed in the case for pulling-out of the leader pin; holding portions formed at the upper case and the lower case, and holding the flange portions of the leader pin in a vicinity of the opening; an overhanging portion provided at least one of the holding portions, and overlapping the flange portion at an inner surface side of the flange portion when the leader pin is held by the holding portions; and wall surfaces formed at the holding portions, peripheral surfaces of the flange portions opposing the wall surfaces when the leader pin is held by the holding portions, wherein a clearance between the main body portion and the overhanging portion is greater than a clearance between the peripheral surface of the flange portion and the wall surface.

In accordance with the eighth aspect, the clearance between the main body portion of the leader pin and the overhanging portion is greater than the clearance between the peripheral surface of the flange portion and the wall surface. Therefore, even if a shock is applied to the case due to dropping or the like and the leader pin moves in a direction orthogonal to the heightwise direction thereof, the main body portion of the leader pin does not contact (press against) the overhanging portion. Accordingly, there is no fear that the overhanging portion will break. Note that the overhanging portion may be structured so as to be formed integrally with the holding portion, or may be structured so as to be mounted to the holding portion as a separate body.

A recording tape cartridge of a third aspect of the present invention has: a case having an upper case and a lower case, and accommodating a single reel on which a recording tape is wound; a leader pin attached directly or via a leader tape to an end portion of the recording tape, flange portions being formed at both ends of a main body portion of the leader pin; an opening formed in the case for pulling-out of the leader pin; holding portions formed at the upper case and the lower case, and holding the flange portions of the leader pin in a vicinity of the opening; an overhanging portion formed at least one of the holding portions, and overlapping the flange portion in a non-contact state at an inner surface side in the tape width direction of the flange portion when the leader pin is held by the holding portions; and wall surfaces formed at the holding portions, peripheral surfaces of the flange portions opposing the wall surfaces when the leader pin is held by the holding portions, wherein a clearance between the inner surface of the flange portion and the overhanging portion, a clearance between the main body portion and the overhanging portion, and a clearance between the peripheral surface of the flange portion and the wall surface are defined such that, when the leader pin tilts, the peripheral surface of the flange portion contacts the wall surface before the inner surface of the flange portion contacts the overhanging portion and before the main body portion contacts the overhanging portion.

Further, a recording tape cartridge of a sixth aspect of the present invention has: a case having an upper case and a lower case, and accommodating a single reel on which a recording tape is wound; a leader pin attached directly or via a leader tape to an end portion of the recording tape, flange portions being formed at both ends of a main body portion of the leader pin; an opening formed in the case for pulling-out of the leader pin; holding portions formed at the upper case and the lower case, and holding the flange portions of the leader pin in a vicinity of the opening; an overhanging portion mounted to at least one of the holding portions, and overlapping the flange portion in a non-contact state at an inner surface side of the flange portion when the leader pin is held by the holding portions; and wall surfaces formed at the holding portions, peripheral surfaces of the flange portions opposing the wall surfaces when the leader pin is held by the holding portions, wherein a clearance between the inner surface of the flange portion and the overhanging portion, a clearance between the main body portion and the overhanging portion, and a clearance between the peripheral surface of the flange portion and the wall surface are defined such that, when the leader pin tilts, the peripheral surface of the flange portion contacts the wall surface before the inner surface of the flange portion contacts the overhanging portion and before the main body portion contacts the overhanging portion.

In accordance with the third aspect and the sixth aspect, when a shock is applied to the case due to dropping or the like and the leader pin starts to tilt in a direction other than the pull-out direction thereof, first, the peripheral surface of the flange portion of the leader pin collides with (pressing against) the wall surface formed at the holding portion. Therefore, the inner surface of the flange portion does not contact (press against) the overhanging portion, and the main body portion does not contact (press against) the overhanging portion. Accordingly, there is no fear that the overhanging portion will break. Note that, because the wall surface which is formed at the holding portion has relatively high rigidity, it can sufficiently withstand even the flange portion colliding against (pressing against) the wall surface.

Further, a recording tape cartridge of a ninth aspect of the present invention has: a case having an upper case and a lower case, and accommodating a single reel on which a recording tape is wound; a leader pin attached directly or via a leader tape to an end portion of the recording tape, flange portions being formed at both ends of a main body portion of the leader pin; an opening formed in the case for pulling-out of the leader pin; an opening formed in the case for pulling-out of the leader pin; holding portions formed at the upper case and the lower case, and holding the flange portions of the leader pin in a vicinity of the opening; an overhanging portion provided at least one of the holding portions, and overlapping the flange portion in a non-contact state at an inner surface side of the flange portion when the leader pin is held by the holding portions; and wall surfaces formed at the holding portions, peripheral surfaces of the flange portions opposing the wall surfaces when the leader pin is held by the holding portions, wherein a difference between an interval, which is between the holding portion formed at the upper case and the holding portion formed at the lower case, and a height of the leader pin including the flange portions is less than a difference between an interval, which is between an outer surface of the overhanging portion and the holding portion, and a thickness of the flange portion, and a clearance between the main body portion and the overhanging portion is greater than a clearance between the peripheral surface of the flange portion and the wall surface.

In accordance with the ninth aspect, the difference between the interval, which is between the holding portion formed at the upper case and the holding portion formed at the lower case, and the height of the leader pin including the flange portions is less than the difference between the interval, which is between the outer surface of the overhanging portion and the holding portion, and the thickness of the flange portion. Further, the clearance between the main body portion of the leader pin and the overhanging portion is greater than the clearance between the peripheral surface of the flange portion and the wall surface. Therefore, even if a shock is applied to the case due to dropping or the like and the leader pin moves in the heightwise direction thereof and a direction orthogonal to the heightwise direction, the inner surface of the flange portion and the main body portion of the leader pin do not contact (press against) the overhanging portion. Accordingly, there is no fear that the overhanging portion will break. Note that the overhanging portion may be structured so as to be formed integrally with the holding portion, or may be structured so as to be mounted to the holding portion as a separate body.

A recording tape cartridge of a tenth aspect has the feature that, in the recording tape cartridge of any one of the first through ninth aspects, the wall surfaces are formed in substantially circular-arc shapes in plan view, and the amount of curvature of the wall surfaces is formed to be the same as or smaller than the amount of curvature of the flange portions.

In accordance with the tenth aspect, the rigidity of the wall surface can be increased. Further, if the amount of curvature of the wall surface is formed to be smaller than the amount of curvature of the flange portion, the flange portion can be prevented from interfering with the end portion of the wall surface at the time when the leader pin is accommodated at the holding portion.

A recording tape cartridge of an eleventh aspect has the feature that, in the recording tape cartridge of any one of the first through sixth aspects, the clearance between the inner surface of the flange portion and the overhanging portion is defined such that the inner surface of the flange portion contacts the overhanging portion when the leader pin tilts in the pull-out direction.

In accordance with the eleventh aspect, when the leader pin tilts in the pull-out direction thereof, the inner surface of the flange portion can be received at the wall surface side end portion of the overhanging portion. Accordingly, at times of non-use when the recording tape cartridge is not loaded in a drive device, tilting of the leader pin in the pull-out direction can be suppressed. Note that, because the wall surface side end portion of the overhanging portion has relatively high rigidity, there is no fear that the overhanging portion will break.

As described above, in accordance with the present invention, there can be provided a recording tape cartridge in which, even if a shock such as being dropped or the like is applied to a case, there is no fear that overhanging portions which overlap flange portions of a leader pin will break.

BRIEF DESCRIPTION OF THE DRAWINGS

An exemplary embodiment of the present invention will be described in detail based on the following figures, wherein.

DETAILED DESCRIPTION

Figure 1:
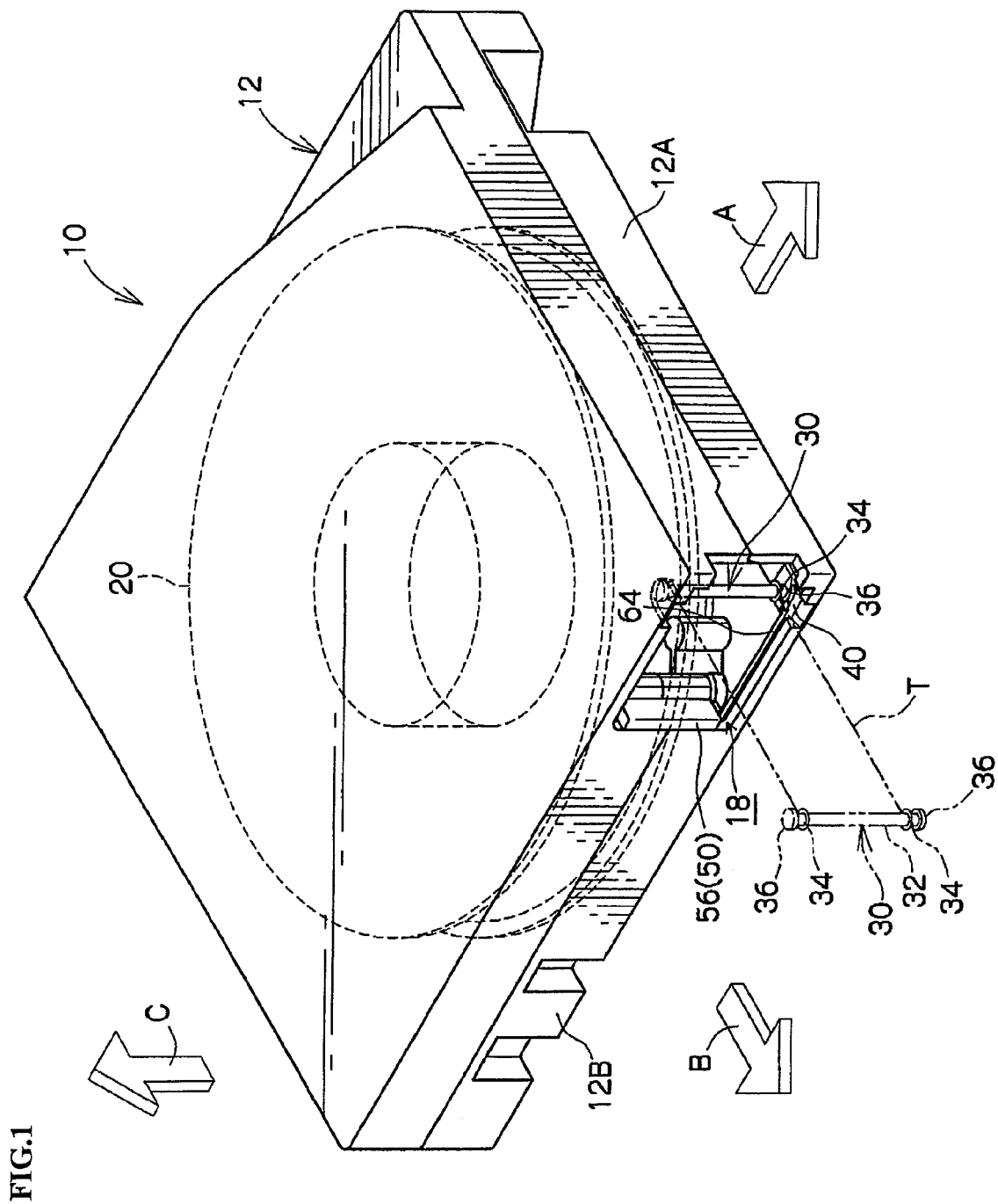
FIG. 1 is a schematic perspective view of a recording tape cartridge.

Hereinafter, a preferred exemplary embodiment of the present invention will be described in detail on the basis of the example shown in the drawings. Note that, for convenience of explanation, in FIG. 1, the direction of loading a recording tape cartridge 10 into a drive device is denoted by arrow A, and this direction of arrow A is the forward direction (front side) of the recording tape cartridge 10. Further, the direction of arrow B, which is orthogonal to arrow A, is the rightward direction (right side), and the direction of arrow C is the upward direction (top side).

Figure 2:
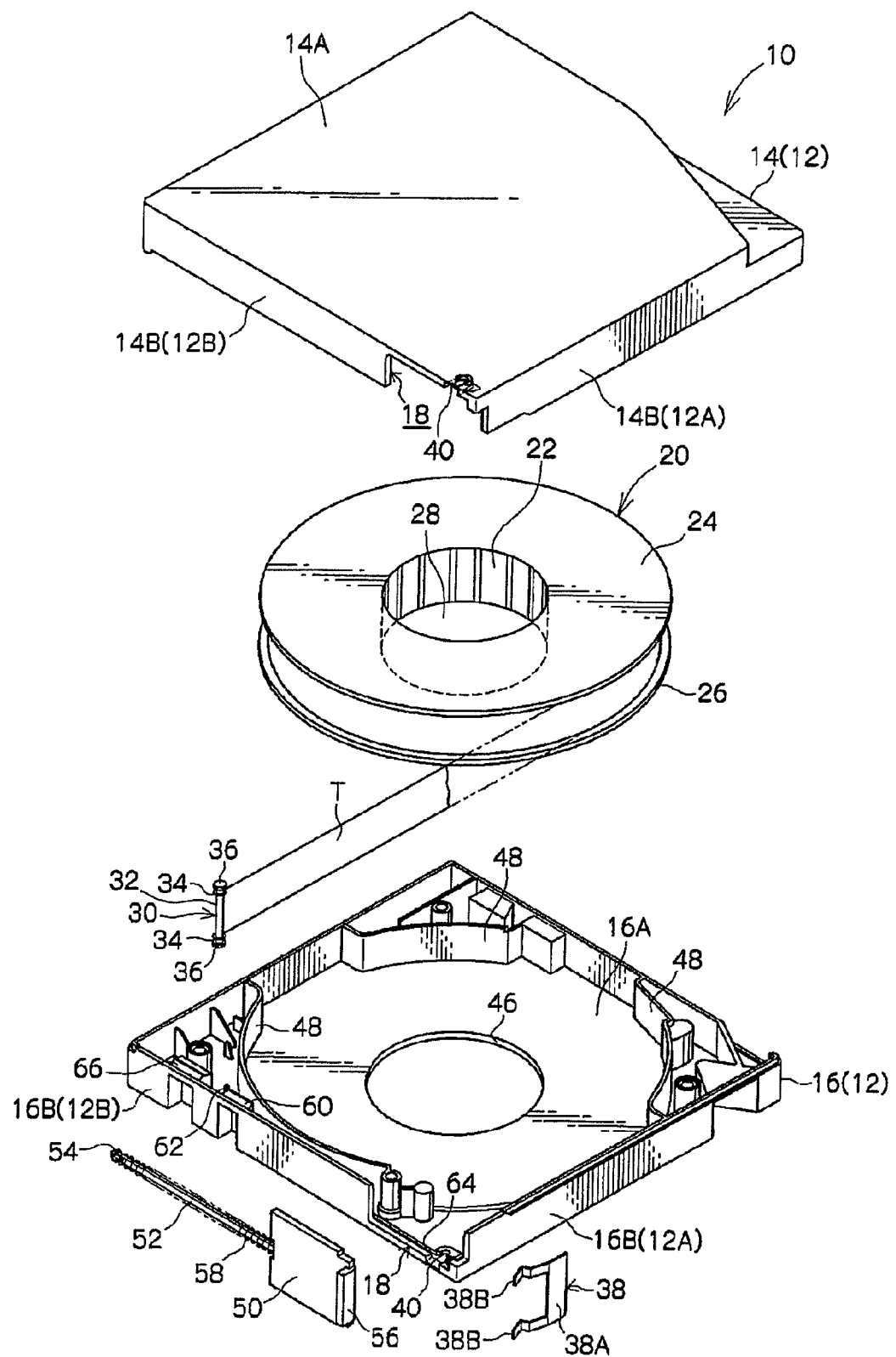
FIG. 2 is a schematic exploded perspective view of the recording tape cartridge.

As shown in FIG. 1 and FIG. 2, the recording tape cartridge 10 has a case 12 which is substantially shaped as a rectangular box. The case 12 is structured by an upper case 14 and a lower case 16, which are made of a synthetic resin such as polycarbonate (PC) or the like, being joined together by ultrasonic welding, screws or the like in a state in which a peripheral wall 14B, which is erectly provided at the peripheral edge of a top plate 14A, and a peripheral wall 16B, which is erectly provided at the peripheral edge of a bottom plate 16A, are abutting one another.

A single reel 20 is rotatably accommodated within the case 12. The reel 20 is structured by a reel hub 22, which is shaped as a cylindrical tube having a bottom and which structures the axially central portion of the reel 20, and a lower flange 26, which is provided at the lower end portion of the reel hub 22, being molded integrally, and an upper flange 24 being ultrasonically welded to the top end portion of the reel hub 22. A recording tape T, such as a magnetic tape or the like which serves as an information recording/playback medium, is wound on the outer peripheral surface of the reel hub 22. The width direction end portions of the wound recording tape T are held by the upper flange 24 and the lower flange 26.

A reel gear (not shown) is formed in an annular shape at the bottom surface of a bottom wall 28 of the reel hub 22. A gear opening 46, which is for exposing this reel gear to the exterior, is pierced in the central portion of the lower case 16. Due to the reel gear, which is exposed from the gear opening 46, meshing-together with a driving gear (not shown) formed at a rotating shaft (not shown) of a drive device (not shown) and being rotated and driven thereby, the reel 20 can rotate relative to the case 12 within the case 12.

Further, an annular reel plate (not shown) formed of a magnetic material is fixed by insert molding or the like to the radial direction inner side of the reel gear at the bottom surface of the bottom wall 28. The reel plate is attracted to and held by the magnetic force of an annular magnet (not shown) which is provided at the rotating shaft of the drive device. Further, the reel 20 is held so as to not joggle by play restricting walls 48 which project out locally at the inner surfaces of the upper case 14 and the lower case 16 and which serve as inner walls which are on a circular locus coaxial with the gear opening 46.

An opening 18, which is for the pulling-out of the recording tape T wound on the reel 20, is formed in a right wall 12B of the case 12. A leader pin 30, which is pulled-out and operated while being anchored (engaged) by a pull-out member (not shown) of the drive device, is fixed either directly or via a leader tape (not shown) to the free end portion of the recording tape T which is pulled-out from the opening 18.

Figure 3:
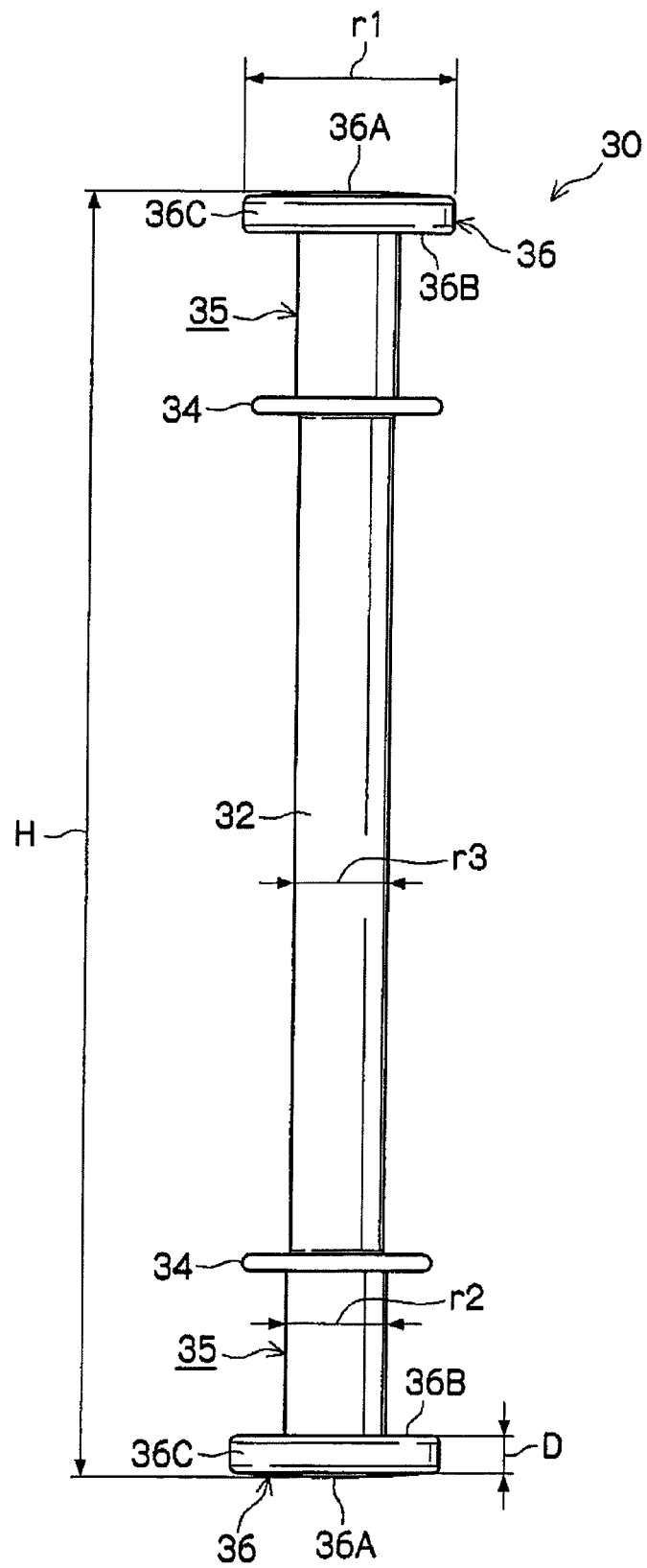
FIG. 3 is a schematic front view of a leader pin.

As shown in detail in FIG. 3, the leader pin 30 has a main body portion 32 which is shaped as a solid cylinder, and, at the both ends of the main body portion 32, flange portions 36 which are disc-shaped and which have larger diameters than the diameter of the main body portion 32 and which are formed integrally therewith. Small flange portions 34, which define the area where the recording tape T is attached, are formed integrally with the main body portion 32. The diameters of the small flange portions 34 are formed to be larger than the diameter of the main body portion 32, and either the same as or smaller than the diameters of the flange portions 36.

The small flange portions 34 are formed to be thinner than the flange portions 36. The regions between the small flange portions 34 and the flange portions 36 are annular grooves 35 which are anchored by hooks (not shown) or the like of the pull-out member of the drive device. By providing these small flange portions 34, there becomes a structure in which the hooks or the like do not contact and damage the recording tape T at the time of pulling-out the recording tape T. Note that outer surfaces 36A of the flange portions 36 are convexly curved surfaces having a small amount of curvature.

Figure 4:
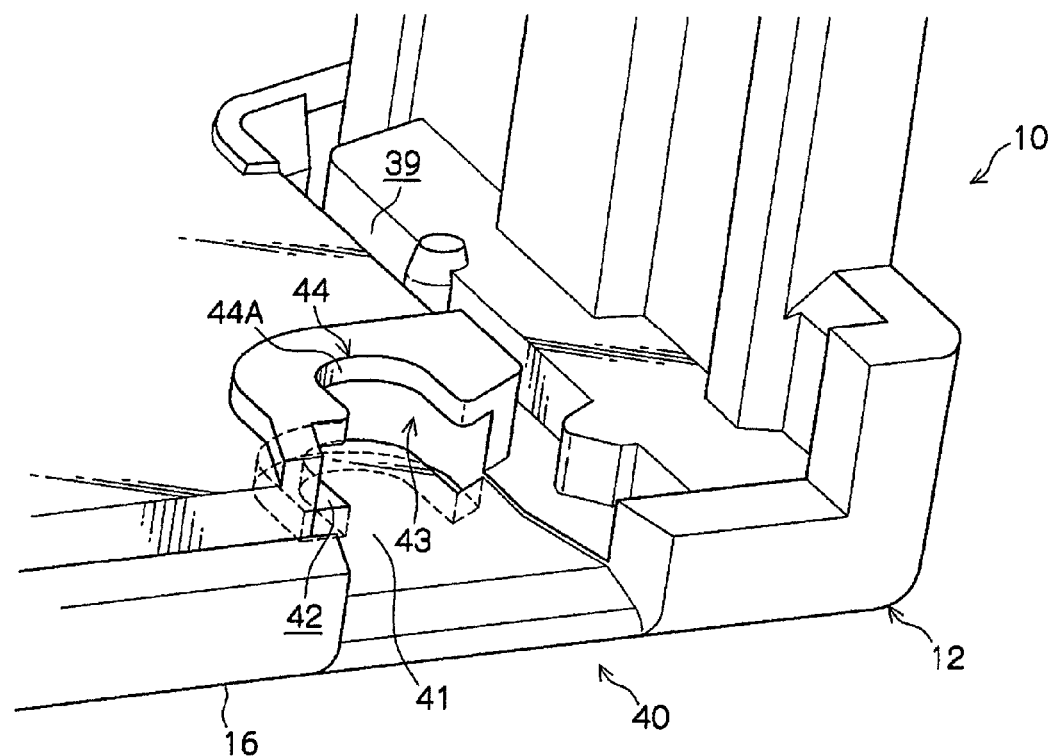
FIG. 4 is a schematic perspective view showing a holding portion.

A pair of upper and lower holding portions 40, which position and hold the leader pin 30 within the case 12, are provided at the inner side of the opening 18 of the case 12, i.e., at the inner surface of the top plate 14A of the upper case 14 and the inner surface of the bottom plate 16A of the lower case 16. As shown in FIG. 4, the holding portions 40 have concave portions 41 which are formed at the inner surface of the top plate 14A and the inner surface of the bottom plate 16A, and which are substantially U-shaped in plan view, and whose recording tape T pull-out sides are open. The flange portions 36 of the leader pin 30, which is in an upright state, can enter into and exit from the concave portions 41 from these open sides. Note that the structure of the holding portion 40 will be described in detail later.

Further, groove portions 39, which accommodate a plate spring 38 which is substantially U-shaped, are formed in the top plate 14A of the upper case 14 and the bottom plate 16A of the lower case 16, between the holding portions 40 and a front wall 12A (see FIG. 4). Namely, the upper and lower end portions of a base portion 38A of the plate spring 38 are fixedly disposed within the groove portions 39.

Bifurcated distal end portions 38B of the plate spring 38 respectively engage (press against) outer peripheral surfaces 36C (see FIG. 3) of the upper and lower flange portions 36 of the leader pin 30, and hold the leader pin 30 at the holding portions 40 (the concave portions 41). Note that, when the leader pin 30 is to enter into or exit from the holding portions 40, the distal end portions 38B of the plate spring 38 are appropriately elastically deformed so as to permit movement of the leader pin 30.

The opening 18 is opened and closed by a door 50. The door 50 is formed in the shape of a substantially rectangular plate of a size which can close the opening 18. Groove portions 64, into which the upper and lower end portions of the door 50 are slidably fit, are formed in the top plate 14A and the bottom plate 16A at the inner side of the opening 18, such that the door 50 can move along the right wall 12B of the case 12.

A shaft 52 is formed to project at the center of the rear end portion of the door 50. A coil spring 58 is fit around the shaft 52. A widening portion 54, which prevents the coil spring 58 from falling-off, is formed at the rear end of the shaft 52. A supporting stand 60, which has an anchor portion 62 which anchors the rear end of the coil spring 58 which is fit around the shaft 52, projects from the lower case 16.

Accordingly, the shaft 52 is supported so as to be freely slidable on the supporting stand 60, and the rear end of the coil spring 58 is anchored on the anchor portion 62. The door 50 is thereby always biased in the direction of closing the opening 18 by the biasing force of the coil spring 58. Note that it is preferable that a supporting stand 66, which supports the shaft 52 when the opening 18 is open, be formed so as to project-out at the rear side of the supporting stand 60.

A convex portion 56 for opening/closing operation projects outwardly from the front end portion of the door 50. The convex portion 56 engages with an opening/closing member (not shown) at the drive device side as the recording tape cartridge 10 is loaded into the drive device. The door 50 is thereby opened against the biasing force of the coil spring 58.

Figure 5:
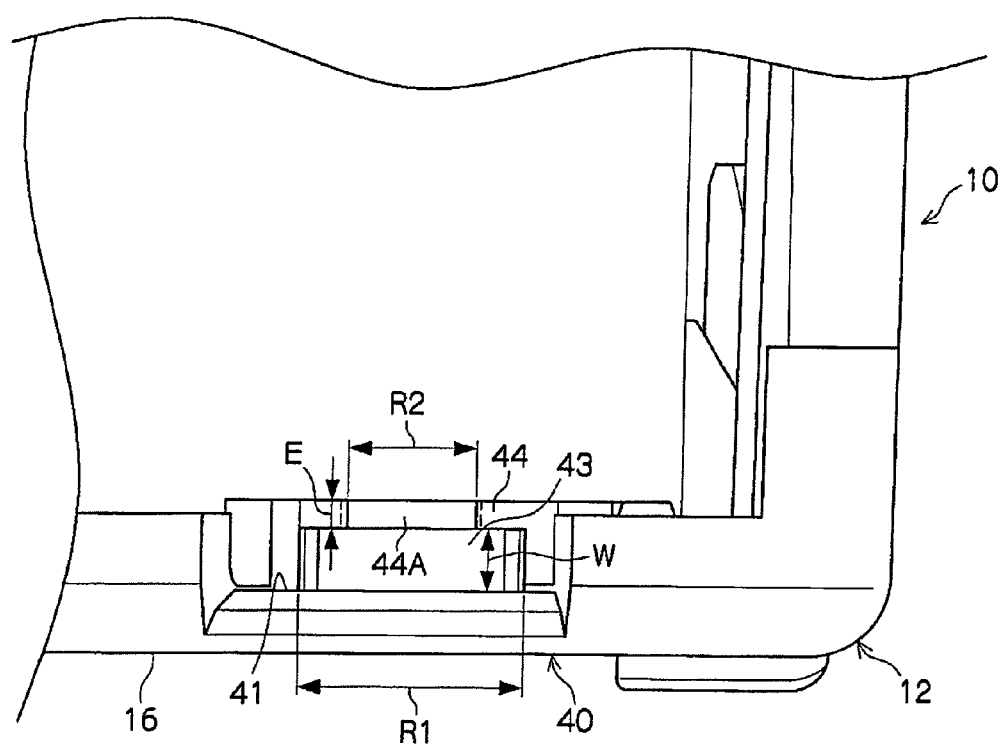
FIG. 5 is a schematic front view showing the holding portion.

Next, the structure of the holding portion 40 will be described in further detail. Note that, because both of the upper and lower holding portions 40 have the same structure, description will be given mainly of the holding portion 40 at the lower case 16 side which is shown in FIG. 4 and FIG. 5. As shown in FIG. 4 and FIG. 5, the holding portion 40 has the concave portion 41 which is substantially U-shaped in plan view and which holds the outer surface 36A of the flange portion 36 (see FIG. 3). An overhanging portion 44, which overlaps by a predetermined amount in a non-contact state with an inner surface 36B side of the flange portion 36 when the leader pin 30 (the flange portions 36) is held by the holding portions 40 (the concave portions 41), is formed at a position which is separated from the concave portion 41 by a predetermined interval in the heightwise direction.

Figure 6A:
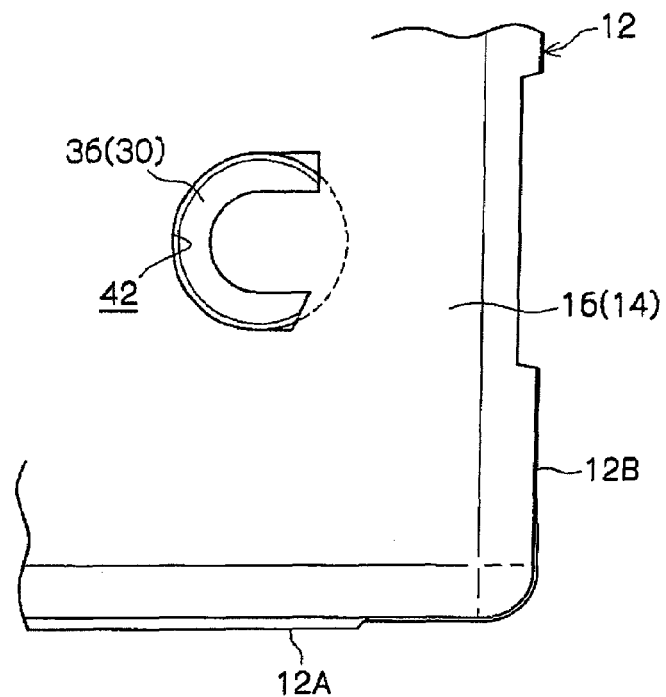
FIG. 6A is a schematic bottom view showing a through-hole formed to have the same amount of curvature as a flange portion.
Figure 6B:
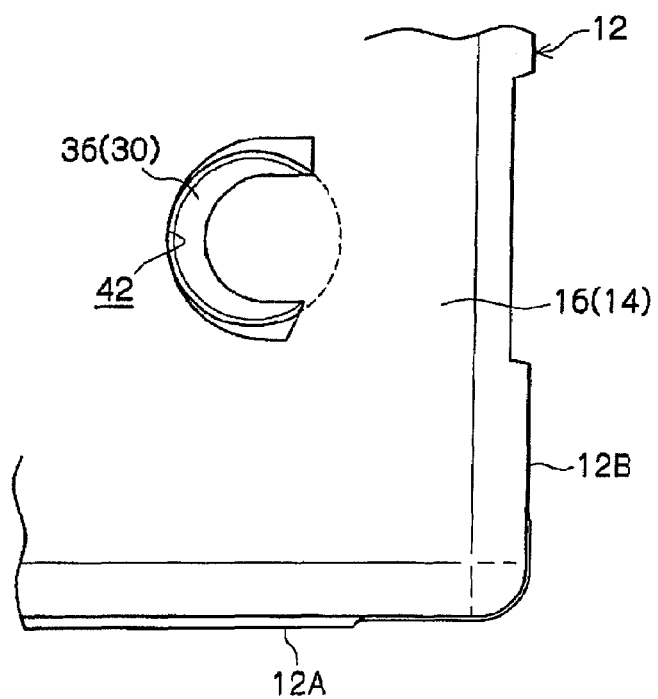
FIG. 6B is a schematic bottom view showing a through-hole formed to have a smaller amount of curvature than the flange portion.

The overhanging portions 44 are molded integrally with the upper case 14 and the lower case 16. The overhanging portions 44 are molded by movable cores (not shown) which are substantially U-shaped as seen in plan view or bottom view (which coincide with the shapes of the overhanging portions 44), such that releasing from an unillustrated mold after molding does not become impossible (such that the overhanging portions 44 do not become so-called undercut portions). Accordingly, at the time of release from the mold after the upper case 14 and the lower case 16 are molded, by removing these movable cores, through-holes (core holes) 42 which are substantially U-shaped in plan view or bottom view are formed in the upper case 14 and the lower case 16 as shown in FIG. 6A and FIG. 6B.

Inner wall surfaces 43, which are substantially U-shaped in plan view and which oppose (abut) the outer peripheral surfaces 36C of the flange portions 36, are formed at the peripheries of the through-holes 42, at the peripheries of the concave portions 41 of the inner surface of the top plate 14A of the upper case 14 and the inner surface of the bottom plate 16A of the lower case 16. The overhanging portions 44 extend integrally from the distal end portions in the heightwise direction of the inner wall surfaces 43 toward the recording tape T pull-out side. Cut-out portions 44A, which are substantially U-shaped in plan view and which can accommodate the annular groove 35 portions of the main body portion 32, are formed in the substantial centers of the recording tape T pull-out sides of the overhanging portions 44.

Figure 7A:
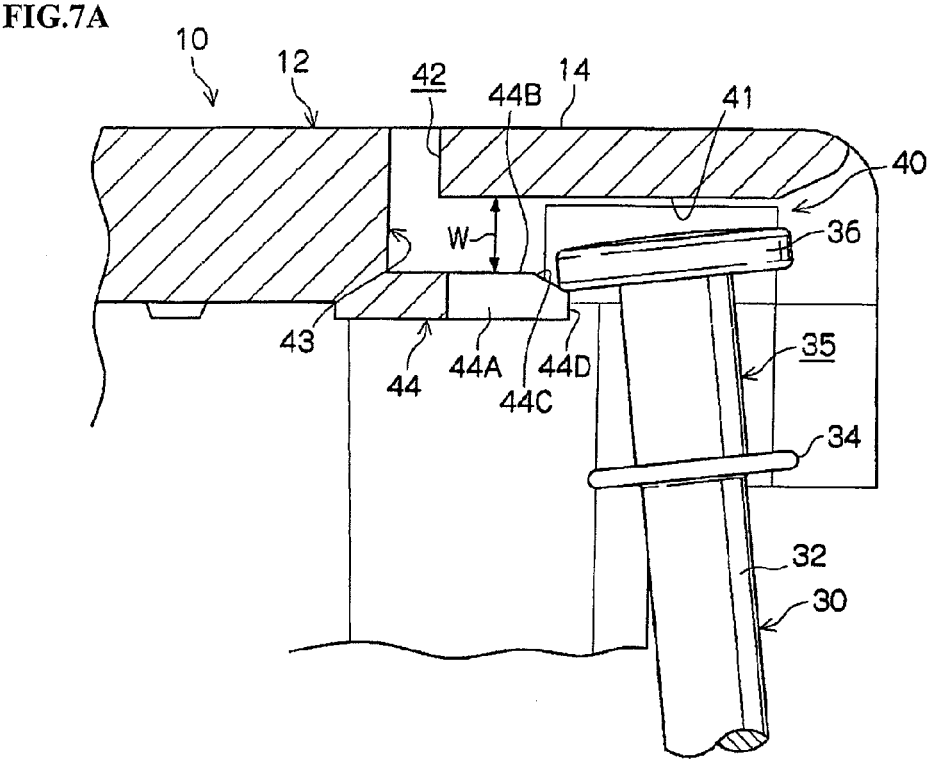
FIG. 7A is a schematic side sectional view showing a state in which the leader pin tilts and is returned to the holding portion.
Figure 7B:
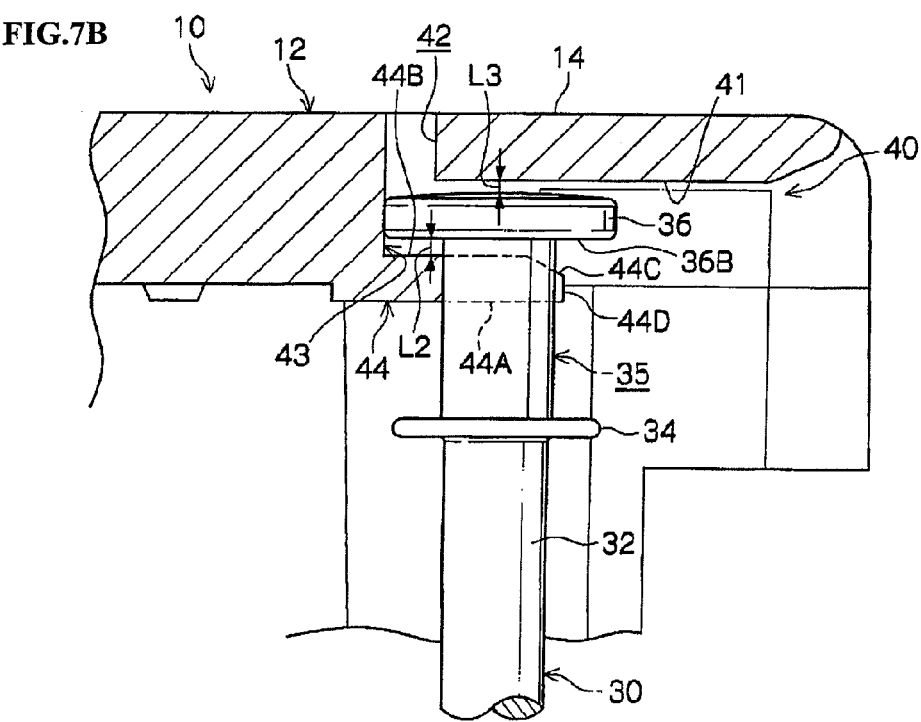
FIG. 7B is a schematic side sectional view showing a state in which the leader pin is held by the holding portion.

As shown in FIG. 5, FIG. 7A and FIG. 7B, an interval W between the concave portion 41 and an outer surface 44B of the overhanging portion 44 which opposes the concave portion 41 is formed to be wider than a thickness D (see FIG. 3) of the flange portion 36 (W>D). Predetermined clearances L2, L3 are formed at the upper case 14 side in the state in which the leader pin 30 is accommodated and held by the holding portions 40, between the inner surface 36B of the flange portion 36 and the outer surface 44B of the overhanging portion 44 which opposes the inner surface 36B, and between the outer surface 36A of the flange portion 36 and the concave portion 41 which opposes the outer surface 36A, respectively.

Further, as shown in FIG. 7A and FIG. 7B, the peripheral surface of the cut-out portion 44A of the overhanging portion 44 at the side where the flange portion 36 enters in is formed to be a tapered surface 44C of a predetermined angle by chamfering or filleting (corner-rounding). In this way, even if the leader pin 30 is returned to the holding portions 40 in a tilted state (see FIG. 7A), the flange portions 36 are accommodated without interfering with (without being stacked against) the overhanging portions 44 (see FIG. 7B).

Namely, the leader pin 30 is thereby made to be a structure which can be stably attached and removed, even though there are the overhanging portions 44. Note that it is preferable to leave a rectilinear portion 44D at the peripheral surface of the cut-out portion 44A. When such a rectilinear portion 44D is left, the strength of the overhanging portion 44 can be ensured (it is possible for the strength of the overhanging portion 44 to not be impaired).

Figure 8:
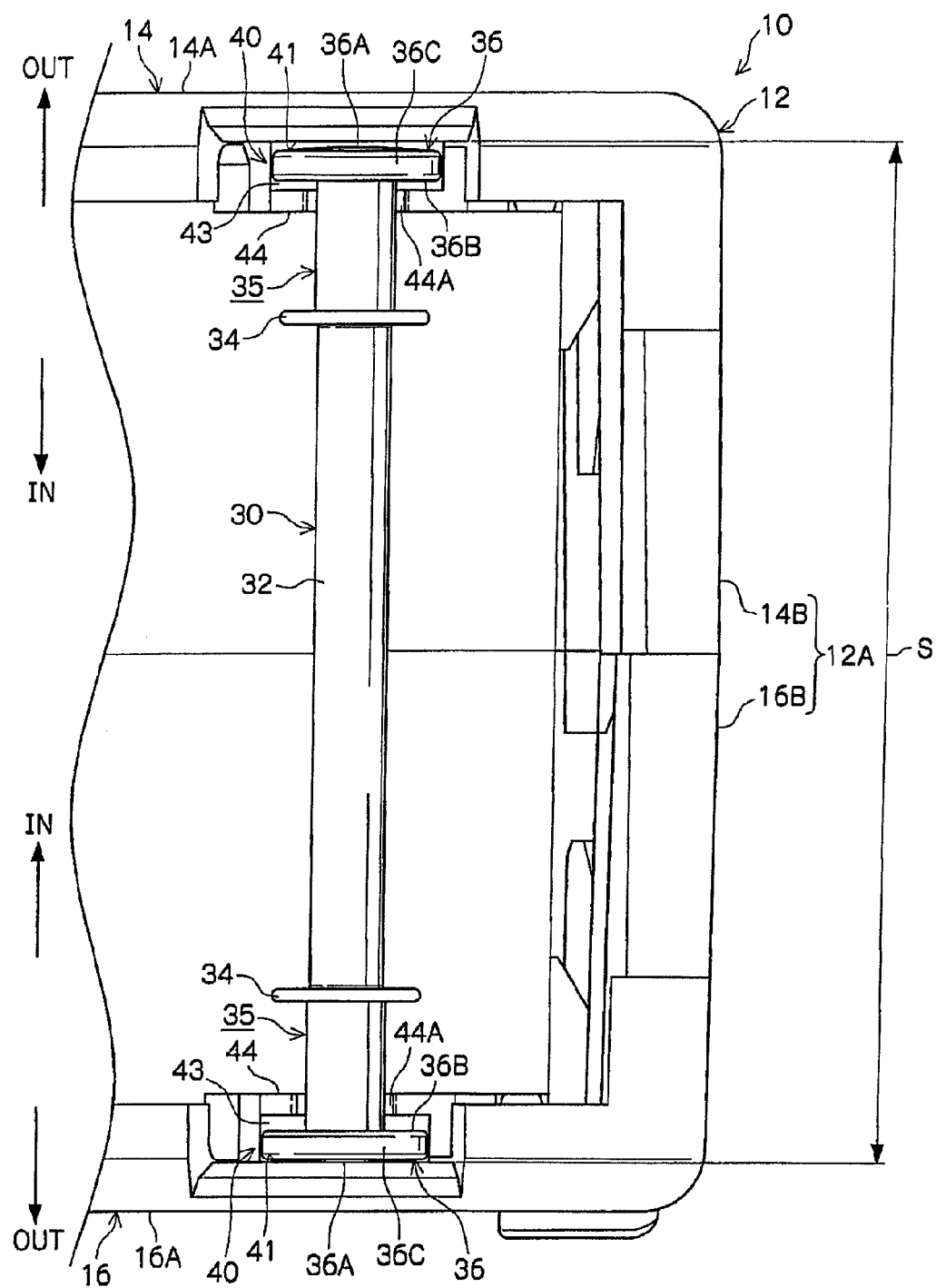
FIG. 8 is a schematic front view showing a state in which the leader pin is held by the holding portions.

The relationships of the clearances between the leader pin 30 and the holding portions 40 will now be explained further on the basis of FIG. 7A, FIG. 7B and FIG. 9. Note that, in FIG. 8, the outer side of the case 12 is indicated by arrows OUT, and the inner side of the case 12 is indicated by arrows IN. The designating of "inward" and "outward" in the present invention is made in accordance with the arrows IN and the arrows OUT shown in FIG. 8. As shown in FIG. 8, in the state in which the leader pin 30 is accommodated and held by the holding portions 40, due to gravity, the outer surface 36A of the flange portion 36 contacts the concave portion 41 at the lower case 16 side, and is separated from the concave portion 41 at the upper case 14 side. Namely, as shown in FIG. 7B, at the upper case 14 side, the predetermined clearance L3 is formed between the concave portion 41 and the outer surface 36A of the flange portion 36. As shown in FIG. 8, this clearance L3 is the difference between an interval S, which is between the concave portion 41 at the upper case 14 (the inner surface of the top plate 14A at the holding portion 40) and the concave portion 41 at the lower case 16 (the inner surface of the bottom plate 16A at the holding portion 40), and the height H (see FIG. 3) of the leader pin 30 including the flange portions 36 (L3=S−H).

Figure 9:
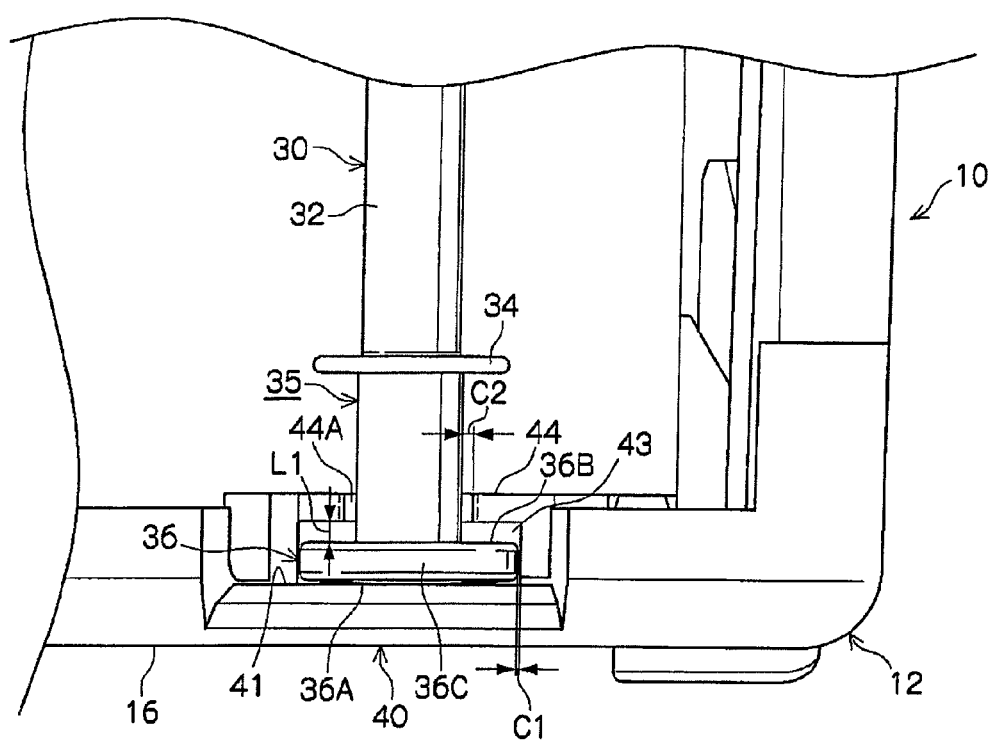
FIG. 9 is a partial, enlarged, schematic front view showing the state in which the leader pin is held by the holding portion.

On the other hand, at the lower case 16 side, as shown in FIG. 9, a clearance L1 between the inner surface 36B of the flange portion 36 and the outer surface 44B of the overhanging portion 44 is a value equal to the interval W, between the concave portion 41 and the outer surface 44B of the overhanging portion 44, minus the thickness D of the flange portion 36 (L1=W−D). As shown in FIG. 7B, clearance L1=clearance L2+clearance L3. Namely, the clearance L1 is structured to be greater, by the amount of the clearance L2, than the clearance L3 (L1>L3). Moreover, the clearance L1 is formed to be greater than a clearance C1 between the outer peripheral surface 36C of the flange portion 36 and the inner wall surface 43 (L1>C1). Further, a clearance C2 between the outer peripheral surface of the main body portion 32 and the inner peripheral surface of the cut-out portion 44A (overhanging portion 44) also is formed to be greater than the clearance C1 between the outer peripheral surface 36C of the flange portion 36 and the inner wall surface 43 (C2>C1).

As shown in FIG. 6A and FIG. 6B, the amount of curvature of the inner wall surface 43 in plan view is either the same as the amount of curvature of the flange portion 36 in plan view (see FIG. 6A), or is smaller than that (see FIG. 6B). Namely, the radius of curvature of the inner wall surface 43 in plan view is either the same as the radius of curvature of the flange portion 36 in plan view or is larger than that.

Here, an example of the clearances of the respective portions will be given by using concrete numerical figures. First, as shown in FIG. 5, the interval W between the outer surface 44B of the overhanging portion 44 and the concave portion 41 is W=0.9 mm, a plate thickness E of the overhanging portion 44 is E=0.4 mm, a diameter R1 of the inner wall surface 43 (2 times the radius of curvature) is R1=3.275 mm, and a diameter R2 of the cut-out portion 44A (2 times the radius of curvature) is R2=1.75 mm.

As shown in FIG. 3, the thickness D of the flange portion 36 of the leader pin 30 is D=0.58 mm, a diameter r1 of the flange portion 36 (2 times the radius of curvature) is r1=3.225 mm, and a diameter r2 of the area which is made to be the annular groove 35 of the main body portion 32 is r2=1.60 mm. Note that a diameter r3 of the area of the main body portion 32 where the recording tape T is attached is r3=1.50 mm.

Accordingly, the clearance L1 is L1=W−D=0.9 mm−0.58 mm=0.32 mm. By the way, the clearance L3 is L3=S−H=0.12 mm, and the clearance L2 is L2=L1−L3=0.32 mm−0.12 mm=0.20 mm. Further, the clearance C1 is C1=(R1−r1)/2=(3.275 mm−3.225 mm)/2=0.05 mm/2=0.025 mm. The clearance C2 is C2=(R2−r2)/2=(1.75 mm−1.60 mm)/2=0.15 mm/2=0.075 mm. Note that the above clearances L1, L2, L3, C1, C2 are defined in a state in which, at the portions at which a draft is provided among the respective portions, the draft is included.

Next, operation of the recording tape cartridge 10 which has the above-described structure will be described. At the recording tape cartridge 10 having the above-described structure, at times of non-use (when the recording tape cartridge 10 is not loaded in a drive device at times of storage, transporting, or the like), the opening 18 is closed by the door 50. Further, the recording tape T is wound on the reel hub 22 of the reel 20.

When the recording tape T is to be used, the recording tape cartridge 10 is loaded into a drive device along the direction of arrow A with its front wall 12A leading. Then, first, the opening/closing member provided at the drive device engages with the convex portion 56 of the door 50. Then, in this state, when the recording tape cartridge 10 moves further in the direction of arrow A, the opening/closing member moves the convex portion 56 relatively rearward against the biasing force of the coil spring 58. In this way, the door 50, from which the convex portion 56 projects-out, slides rearward within the groove portions 64 along the right wall 12B, and opens the opening 18.

When the recording tape cartridge 10 is loaded in the drive device to a predetermined depth and the opening 18 is completely opened in this way, the recording tape cartridge 10 is lowered a predetermined height, and positioning members (not shown) of the drive device are inserted into holes for positioning (not shown) which are formed in the lower case 16. In this way, the recording tape cartridge 10 is positioned accurately at a predetermined position within the drive device, and further sliding of the door 50 (further movement of the door 50 rearward) is restricted.

Due to the operation of the recording tape cartridge 10 being lowered, the rotating shaft relatively enters-in from the gear opening 46 and causes the driving gear to mesh with the reel gear. Then, in the state in which the driving gear and the reel gear are completely meshed-together, the reel plate is attracted and held by the magnetic force of the annular magnet which is provided at the inner side of the driving gear. In this way, the reel 20 becomes able to rotate relative to the case 12 within the case 12, while the meshing-together of the reel gear with the driving gear is maintained.

On the other hand, the pull-out member which is provided at the drive device enters into the case 12 from the opening 18 which has been opened, and grasps and pulls-out the leader pin 30 which is positioned and held by the holding portions 40. Note that, because the recording tape cartridge 10 is accurately positioned within the drive device at this time, the hooks of the pull-out member can reliably be made to anchor the annular grooves 35 of the leader pin 30.

The leader pin 30 which is pulled-out from the opening 18 in this way is accommodated at an unillustrated take-up reel. Then, by rotating and driving this take-up reel and the reel 20 synchronously, the recording tape T is successively pulled-out from the case 12 while being taken-up onto the take-up reel, and recording or playback of information is carried out by a recording/playback head (not shown) which is disposed along a predetermined tape path.

When the recording tape cartridge 10 for which recording or playback of information has been completed is to be ejected from the drive device, first, due to the rotating shaft rotating reversely, the recording tape T is rewound onto the reel 20. Then, when the recording tape T is rewound to the end on the reel 20, the leader pin 30 is held by the holding portions 40. Note that, at this time, the distal end portions 38B of the plate spring 38 elastically deform appropriately, and allow the leader pin 30 to be accommodated in the holding portions 40. Further, the overhanging portions 44 overlap the flange portions 36 by a predetermined amount in plan view, at the inner surface 36B sides of the flange portions 36.

Thereafter, the recording tape cartridge 10 is raised a predetermined height, the positioning members are pulled-out from the holes for positioning, and the rotating shaft is pulled-out from the gear opening 46 and the meshing of the driving gear with the reel gear is cancelled. Then, the recording tape cartridge 10 is moved in the direction opposite the direction of arrow A by an unillustrated ejecting mechanism. Thus, accompanying this movement, the door 50 is slid in the direction of closing the opening 18 by the biasing force of the coil spring 58, and completely closes the opening 18 (returns to the initial state). In this way, the recording tape cartridge 10, at which the opening 18 is closed, is completely ejected from the interior of the drive device.

Operation of the holding portions 40 will be described here. As shown in FIG. 8, the leader pin 30 is held by the holding portions 40 in a state in which the flange portions 36, which are provided at both the top and bottom end portions of the main body portion 32, have entered in between the overhanging portion 44 and the inner surface of the top plate 14A of the upper case 14, and between the overhanging portion 44 and the inner surface of the bottom plate 16A of the lower case 16, respectively. Accordingly, even if a shock is applied to a vicinity of the opening 18 due to the recording tape cartridge 10 being dropped or the like, and the vicinity of the opening 18 starts to flexurally deform so as to open (such that the upper case 14 and the lower case 16 separate from one another), this flexural deformation can be suppressed by the leader pin 30.

Namely, when the vicinity of the opening 18 flexurally deforms so as to open, the outer surface 44B sides of the overhanging portions 44 press against the inner surface 36B sides of the flange portions 36 of the leader pin 30, and therefore, this opening can be suppressed by the leader pin 30. Further, due thereto, the flange portions 36 of the leader pin 30 are restrained by the overhanging portions 44, and therefore, the leader pin 30 is prevented from separating from the holding portions 40.

Figure 10:
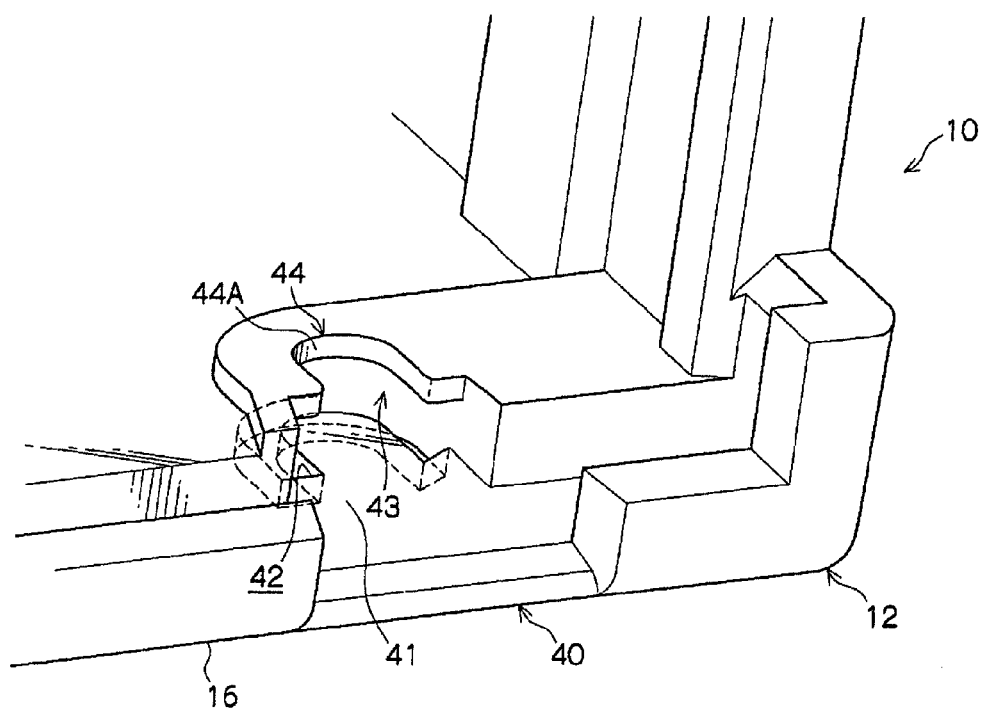
FIG. 10 is a schematic perspective view showing the holding portion when a spring which restrains the leader pin is omitted.

Moreover, at times of non-use when the recording tape cartridge 10 is not loaded in a drive device, the overhanging portions 44 can accommodate the main body portion 32 of the leader pin 30 due to the cut-out portions 44A which are substantially U-shaped in plan view, and, at the inner surface 36B sides of the flange portions 36, the overhanging portions 44 overlap the flange portions 36 by a predetermined amount. Therefore, tilting of the leader pin 30 is prevented, and the leader pin 30 is prevented from separating from the holding portions 40. Accordingly, as shown in FIG. 10, the plate spring 38 which restrains the leader pin 30 (the flange portions 36) can be omitted.

At the leader pin 30 and the holding portions 40, the clearances L1, L2, L3, C1, and C2 of the respective portions are defined as described above. Therefore, when a shock is applied to the case 12 due to the recording tape cartridge 10 being dropped or the like and the leader pin 30 tilts or moves in a direction other than the direction of pulling-out thereof, for example, in a direction substantially orthogonal to the pull-out direction (e.g., the heightwise direction or a direction orthogonal to the heightwise direction), the outer surfaces 36A of the leader pin 30 collide with (press against) the concave portions 41 formed at the holding portions 40, and the outer peripheral surfaces 36C of the flange portions 36 of the leader pin 30 collide with (press against) the inner wall surfaces 43 which are formed at the holding portions 40, but the inner walls 36B of the flange portions 36 do not contact (press against) the overhanging portions 44, and the main body portion 32 does not contact (press against) the overhanging portions 44. Accordingly, there is no fear that the overhanging portions 44, which have the aforementioned plate thickness E, will be damaged.

Note that the inner wall surfaces 43 which are formed at the holding portions 40 have relatively high rigidity, and therefore, can sufficiently withstand the pressing force even if the outer peripheral surfaces 36C of the flange portions 36 collide with (press against) the inner wall surfaces 43. In particular, when the inner wall surfaces 43 are formed in circular-arc-shapes in plan view and the amount of curvature of the inner wall surfaces 43 is formed to be either the same as or less than the amount of curvature of the flange portions 36, the rigidity of the inner wall surfaces 43 can be increased even more. Further, if the amount of curvature of the inner wall surfaces 43 is formed to be smaller than the amount of curvature of the flange portions 36, at the time when the leader pin 30 is accommodated at the holding portions 40 (the concave portions 41), the flange portions 36 can be prevented from interfering with the pull-out side end portions of the inner wall surfaces 43.

Figure 11:
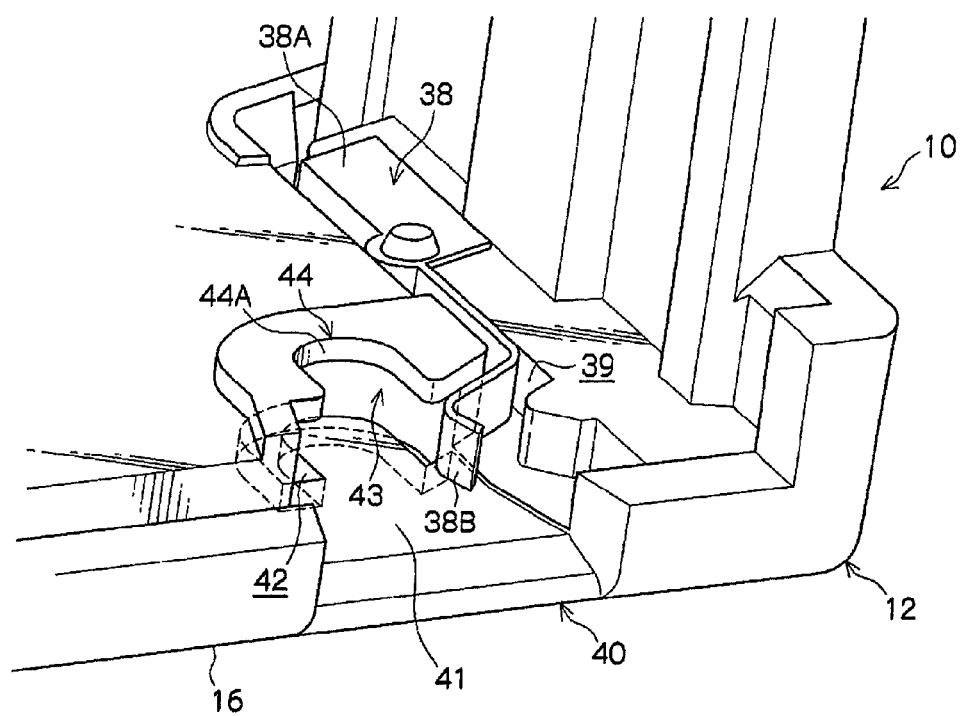
FIG. 11 is a schematic perspective view showing the holding portion when springs which restrain the leader pin are separated at the upper side and the lower side.

Moreover, as shown in FIG. 11, in a case in which plate springs 38 which restrain the leader pin 30 are provided separately and independently at the upper side and the lower side, i.e., in a case in which the plate springs 38 are respectively mounted separately to the upper case 14 and the lower case 16 by caulking or the like, there is the concern that, when the operations of attaching and removing the leader pin 30 are repeated, the biasing force at either one of the upper and lower plate springs 38 will deteriorate, and the leader pin 30 will tilt in the pull-out direction thereof.

However, in this case, the inner walls 36B of the flange portions 36 can be received at the inner wall surface 43 side (deep side) end portions (the bottom surfaces) of the overhanging portions 44. Namely, at times of non-use when the recording tape cartridge 10 is not loaded in the drive device, tilting of the leader pin 30 in the pull-out direction thereof can be suppressed. Note that, because the inner wall surface 43 side end portions of the overhanging portions 44 have relatively high rigidity, there is no fear that they will break even if the inner surfaces 36B of the flange portions 36 collide therewith (press against them).

Moreover, when the overhanging portions 44 are molded so as to not become undercut portions (i.e., by movable cores) as described above, there is no need to provide a sliding mechanism at the mold, and the structure of the mold does not become complex. Namely, the structure of the mold can be simplified, and the drawback of the mold becoming expensive does not arise. However, in this case, because the through-holes 42 are formed in the upper case 14 and the lower case 16, it is preferable to block-up the through-holes 42 by unillustrated blocking members such as sealing members or the like. By doing so, the ability to dustproof the case 12 interior can be ensured.

Figure 12:
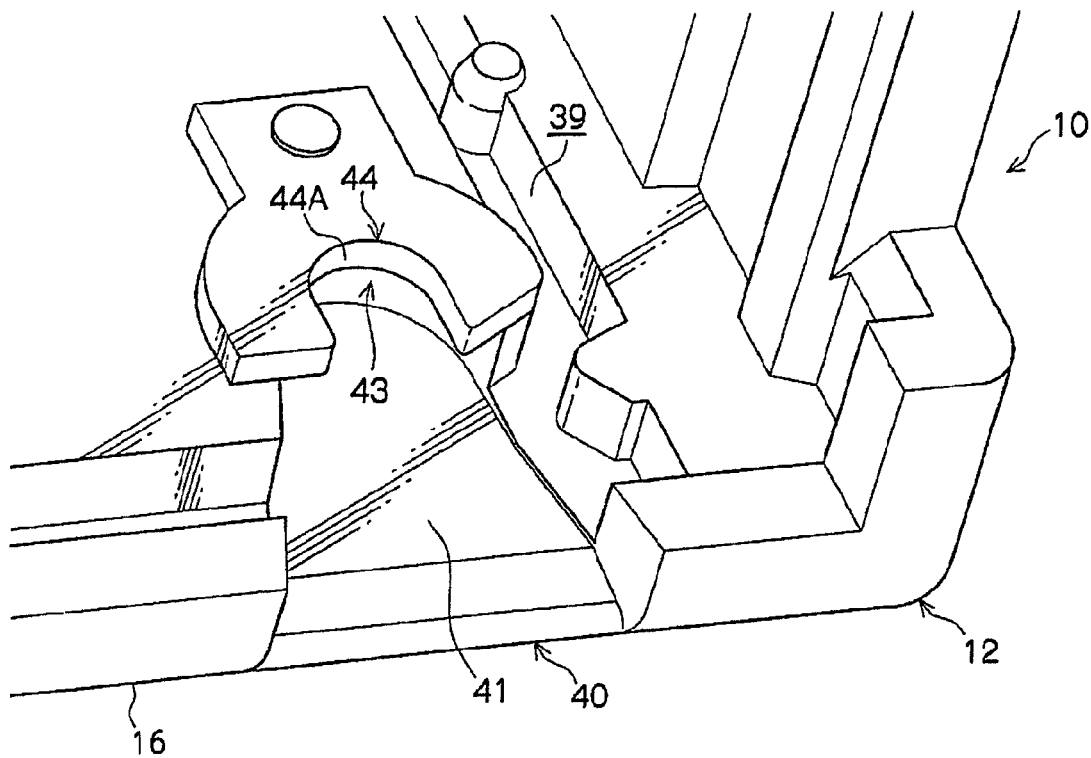
FIG. 12 is a schematic perspective view showing the holding portion when an overhanging portion is formed as a separate member.
Figure 13:
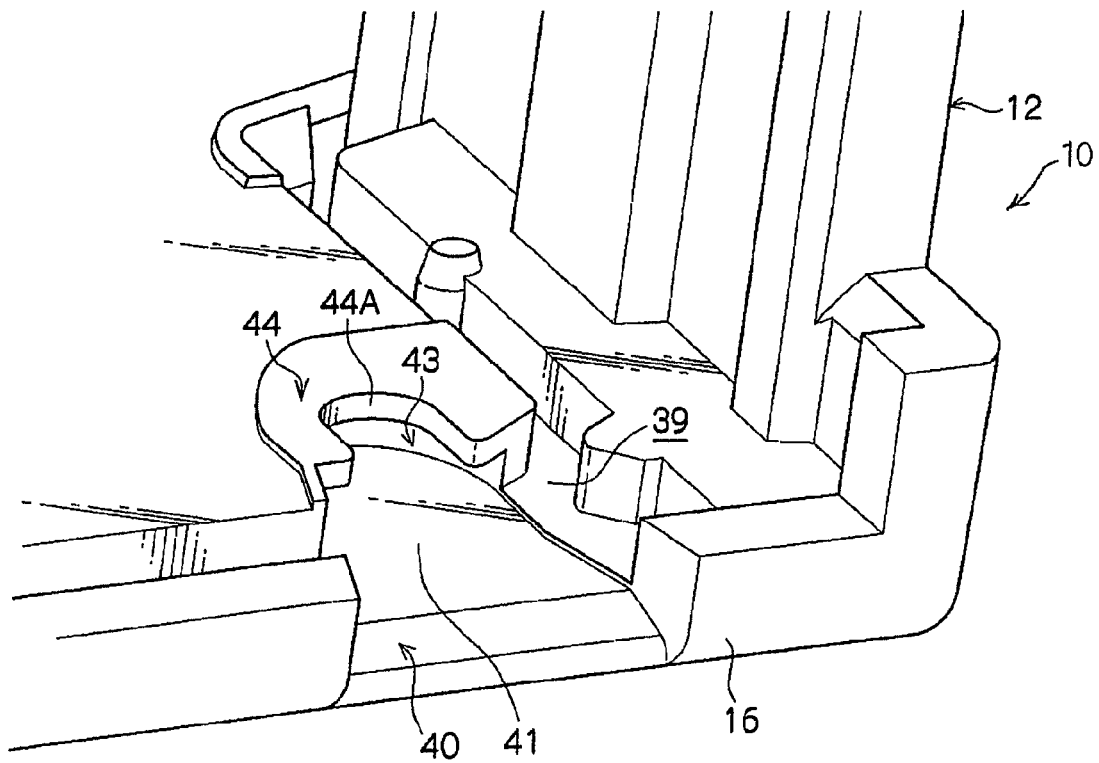
FIG. 13 is a schematic perspective view showing the holding portion when the overhanging portion is made to be an undercut portion.

Further, as shown in FIG. 12, the overhanging portions 44 may be formed as separate members, and, after the molding of the upper case 14 and the lower case 16, the overhanging portions 44 which are formed as separate members may be mounted to the inner surface of the top plate 14A and the inner surface of the bottom plate 16A by caulking, welding, or the like. In accordance with such a structure, it is possible to not form the through-holes 42, and therefore, the ability to dustproof the case 12 interior can be sufficiently ensured.

Note that the overhanging portions 44 are not limited to portions which are molded by movable cores or portions which are mounted as separate members. As shown in FIG.

13, a sliding mechanism may be provided at the mold, and the overhanging portions 44 may be molded integrally as undercut portions. Further, although it is desirable to provide the overhanging portions 44 at both the upper case 14 and the lower case 16, it is possible to provide the overhanging portion 44 at only either one of the upper case 14 or the lower case 16.

What is claimed is:

1. A recording tape cartridge, comprising:
   a case having an upper case and a lower case, and accommodating a single reel on which a recording tape is wound;
   a leader pin attached directly or via a leader tape to an end portion of the recording tape, flange portions being formed at both ends of the leader pin;
   an opening formed in the case for pulling-out of the leader pin;
   holding portions formed at the upper case and the lower case, and holding the flange portions of the leader pin in a vicinity of the opening;
   an overhanging portion formed at at least one of the holding portions, and overlapping the flange portion in a non-contact state at an inner surface side in the tape width direction of the flange portion when the leader pin is held by the holding portions; and
   wall surfaces formed at the holding portions, peripheral surfaces of the flange portions opposing the wall surfaces when the leader pin is held by the holding portions,
   wherein a clearance between the inner surface of the flange portion and the overhanging portion and a clearance between the peripheral surface of the flange portion and the wall surface are defined such that, when the leader pin tilts, the peripheral surface of the flange portion contacts the wall surface before the inner surface of the flange portion contacts the overhanging portion.

2. The recording tape cartridge of claim 1, wherein the wall surfaces are formed in substantially circular-arc shapes in plan view, and the amount of curvature of the wall surfaces is formed to be the same as or smaller than the amount of curvature of the flange portions.

3. The recording tape cartridge of claim 1, wherein the clearance between the inner surface of the flange portion and the overhanging portion is defined such that the inner surface of the flange portion contacts the overhanging portion when the leader pin tilts in the pull-out direction.

4. A recording tape cartridge, comprising:
   a case having an upper case and a lower case, and accommodating a single reel on which a recording tape is wound;
   a leader pin attached directly or via a leader tape to an end portion of the recording tape, flange portions being formed at both ends of a main body portion of the leader pin;
   an opening formed in the case for pulling-out of the leader pin;
   holding portions formed at the upper case and the lower case, and holding the flange portions of the leader pin in a vicinity of the opening;
   an overhanging portion formed at least one of the holding portions, and overlapping the flange portion at an inner surface side in the tape width direction of the flange portion when the leader pin is held by the holding portions; and
   wall surfaces formed at the holding portions, peripheral surfaces of the flange portions opposing the wall surfaces when the leader pin is held by the holding portions,
   wherein a clearance between the main body portion and the overhanging portion and a clearance between the peripheral surface of the flange portion and the wall surface are defined such that, when the leader pin tilts, the peripheral surface of the flange portion contacts the wall surface before the main body portion contacts the overhanging portion.

5. A recording tape cartridge, comprising:
   a case having an upper case and a lower case, and accommodating a single reel on which a recording tape is wound;
   a leader pin attached directly or via a leader tape to an end portion of the recording tape, flange portions being formed at both ends of a main body portion of the leader pin;
   an opening formed in the case for pulling-out of the leader pin;
   holding portions formed at the upper case and the lower case, and holding the flange portions of the leader pin in a vicinity of the opening;
   an overhanging portion formed at at least one of the holding portions, and overlapping the flange portion in a non-contact state at an inner surface side in the tape width direction of the flange portion when the leader pin is held by the holding portions; and
   wall surfaces formed at the holding portions, peripheral surfaces of the flange portions opposing the wall surfaces when the leader pin is held by the holding portions,
   wherein a clearance between the inner surface of the flange portion and the overhanging portion, a clearance between the main body portion and the overhanging portion, and a clearance between the peripheral surface of the flange portion and the wall surface are defined such that, when the leader pin tilts, the peripheral surface of the flange portion contacts the wall surface before the inner surface of the flange portion contacts the overhanging portion and before the main body portion contacts the overhanging portion.

6. A recording tape cartridge, comprising:
   a case having an upper case and a lower case, and accommodating a single reel on which a recording tape is wound;
   a leader pin attached directly or via a leader tape to an end portion of the recording tape, flange portions being formed at both ends of the leader pin;
   an opening formed in the case for pulling-out of the leader pin;
   holding portions formed at the upper case and the lower case, and holding the flange portions of the leader pin in a vicinity of the opening;
   an overhanging portion mounted to at least one of the holding portions, and overlapping the flange portion in a non-contact state at an inner surface side in the tape width direction of the flange portion when the leader pin is held by the holding portions; and
   wall surfaces formed at the holding portions, peripheral surfaces of the flange portions opposing the wall surfaces when the leader pin is held by the holding portions,
   wherein a clearance between the inner surface of the flange portion and the overhanging portion and a clearance between the peripheral surface of the flange portion and the wall surface are defined such that, when the leader pin tilts, the peripheral surface of the flange portion contacts the wall surface before the inner surface of the flange portion contacts the overhanging portion.

7. The recording tape cartridge of claim 6, wherein the wall surfaces are formed in substantially circular-arc shapes in plan view, and the amount of curvature of the wall surfaces is formed to be the same as or smaller than the amount of curvature of the flange portions.

8. The recording tape cartridge of claim 6, wherein the clearance between the inner surface of the flange portion and the overhanging portion is defined such that the inner surface of the flange portion contacts the overhanging portion when the leader pin tilts in the pull-out direction.

9. A recording tape cartridge, comprising:
a case having an upper case and a lower case, and accommodating a single reel on which a recording tape is wound;
a leader pin attached directly or via a leader tape to an end portion of the recording tape, flange portions being formed at both ends of a main body portion of the leader pin;
an opening formed in the case for pulling-out of the leader pin;
holding portions formed at the upper case and the lower case, and holding the flange portions of the leader pin in a vicinity of the opening;
an overhanging portion mounted to at least one of the holding portions, and overlapping the flange portion at an inner surface side in the tape width direction of the flange portion when the leader pin is held by the holding portions; and
wall surfaces formed at the holding portions, peripheral surfaces of the flange portions opposing the wall surfaces when the leader pin is held by the holding portions,
wherein a clearance between the main body portion and the overhanging portion and a clearance between the peripheral surface of the flange portion and the wall surface are defined such that, when the leader pin tilts, the peripheral surface of the flange portion contacts the wall surface before the main body portion contacts the overhanging portion.

10. A recording tape cartridge, comprising:
a case having an upper case and a lower case, and accommodating a single reel on which a recording tape is wound;
a leader pin attached directly or via a leader tape to an end portion of the recording tape, flange portions being formed at both ends of a main body portion of the leader pin;
an opening formed in the case for pulling-out of the leader pin;
holding portions formed at the upper case and the lower case, and holding the flange portions of the leader pin in a vicinity of the opening;
an overhanging portion mounted to at least one of the holding portions, and overlapping the flange portion in a non-contact state at an inner surface side in the tape width direction of the flange portion when the leader pin is held by the holding portions; and
wall surfaces formed at the holding portions, peripheral surfaces of the flange portions opposing the wall surfaces when the leader pin is held by the holding portions,
wherein a clearance between the inner surface of the flange portion and the overhanging portion, a clearance between the main body portion and the overhanging portion, and a clearance between the peripheral surface of the flange portion and the wall surface are defined such that, when the leader pin tilts, the peripheral surface of the flange portion contacts the wall surface before the inner surface of the flange portion contacts the overhanging portion and before the main body portion contacts the overhanging portion.

11. A recording tape cartridge, comprising:
a case having an upper case and a lower case, and accommodating a single reel on which a recording tape is wound;
a leader pin attached directly or via a leader tape to an end portion of the recording tape, flange portions being formed at both ends of the leader pin;
an opening formed in the case for pulling-out of the leader pin;
holding portions formed at the upper case and the lower case, and holding the flange portions of the leader pin in a vicinity of the opening; and
an overhanging portion provided at at least one of the holding portions, and overlapping the flange portion in a non-contact state at an inner surface side in the tape width direction of the flange portion when the leader pin is held by the holding portions,
wherein a difference between an interval, which is between the holding portion formed at the upper case and the holding portion formed at the lower case, and a height of the leader pin including the flange portions is less than a difference between an interval, which is between an outer surface of the overhanging portion and the holding portion, and a thickness of the flange portion.

12. The recording tape cartridge of claim 11, wherein the wall surfaces are formed in substantially circular-arc shapes in plan view, and the amount of curvature of the wall surfaces is formed to be the same as or smaller than the amount of curvature of the flange portions.

13. A recording tape cartridge, comprising:
a case having an upper case and a lower case, and accommodating a single reel on which a recording tape is wound;
a leader pin attached directly or via a leader tape to an end portion of the recording tape, flange portions being formed at both ends of a main body portion of the leader pin;
an opening formed in the case for pulling-out of the leader pin;
holding portions formed at the upper case and the lower case, and holding the flange portions of the leader pin in a vicinity of the opening;
an overhanging portion provided at at least one of the holding portions, and overlapping the flange portion at an inner surface side in the tape width direction of the flange portion when the leader pin is held by the holding portions; and
wall surfaces formed at the holding portions, peripheral surfaces of the flange portions opposing the wall surfaces when the leader pin is held by the holding portions,
wherein a clearance between the main body portion and the overhanging portion is greater than a clearance between the peripheral surface of the flange portion and the wall surface.

14. A recording tape cartridge, comprising:
a case having an upper case and a lower case, and accommodating a single reel on which a recording tape is wound;
a leader pin attached directly or via a leader tape to an end portion of the recording tape, flange portions being formed at both ends of a main body portion of the leader pin;
an opening formed in the case for pulling-out of the leader pin;
holding portions formed at the upper case and the lower case, and holding the flange portions of the leader pin in a vicinity of the opening;

an overhanging portion provided at at least one of the holding portions, and overlapping the flange portion in a non-contact state at an inner surface side in the tape width direction of the flange portion when the leader pin is held by the holding portions; and wall surfaces formed at the holding portions, peripheral surfaces of the flange portions opposing the wall surfaces when the leader pin is held by the holding portions, wherein a difference between an interval, which is between the holding portion formed at the upper case and the holding portion formed at the lower case, and a height of the leader pin including the flange portions is less than a difference between an interval, which is between an outer surface of the overhanging portion and the holding portion, and a thickness of the flange portion, and a clearance between the main body portion and the overhanging portion is greater than a clearance between the peripheral surface of the flange portion and the wall surface.

* * * * *